March 21, 1961 W. B. NELSON 2,975,898
APPARATUS FOR DRYING AND CLEANING SEEDS
Filed Nov. 24, 1958 2 Sheets-Sheet 1
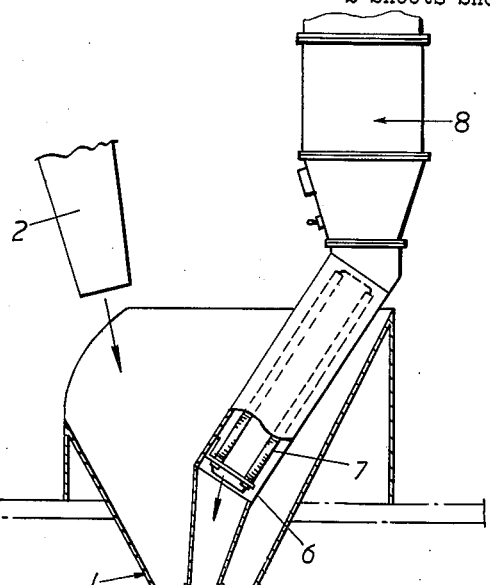
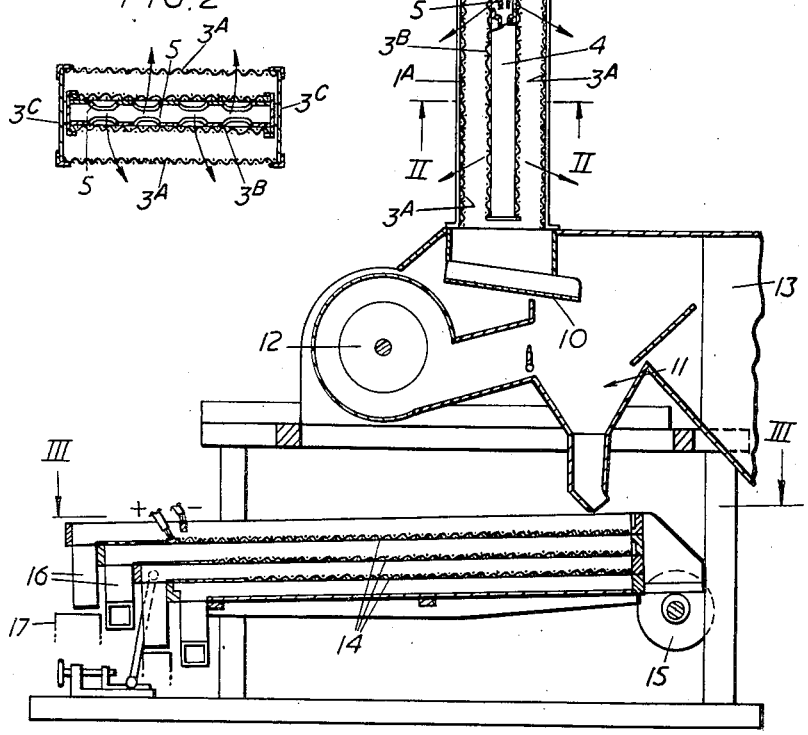
Inventor
William B. Nelson
By A. Knight Croad
Attorney March 21, 1961    W. B. NELSON    2,975,898
APPARATUS FOR DRYING AND CLEANING SEEDS
Filed Nov. 24, 1958    2 Sheets-Sheet 2
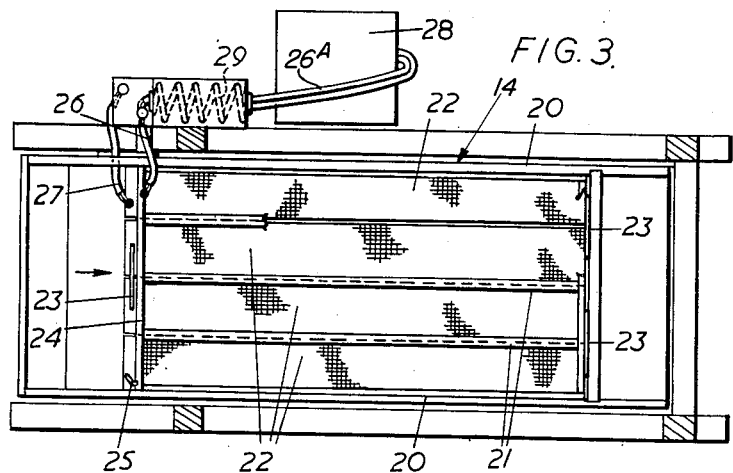
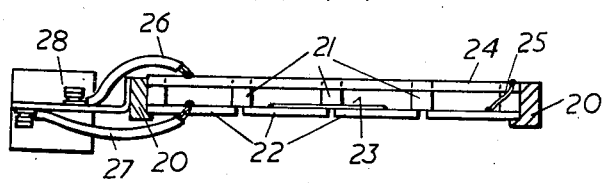
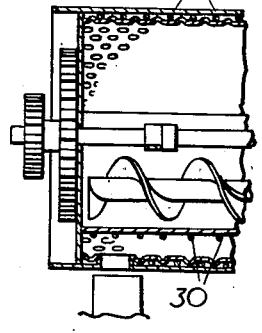
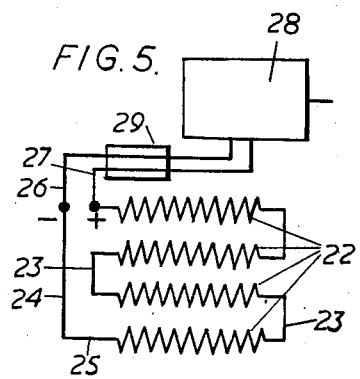
Inventor
William B. Nelson
By
A. Knight Broad
Attorney

United States Patent Office 2,975,898
Patented Mar. 21, 1961

2,975,898

APPARATUS FOR DRYING AND CLEANING SEEDS

William Bernhard Nelson, Epsom Downs, England, assignor to R. W. Gunson (Seeds) Limited, London, England Filed Nov. 24, 1958, Ser. No. 776,147

Claims priority, application Great Britain Oct. 3, 1958

6 Claims. (Cl. 209—238)

This invention relates to apparatus for drying and cleaning seeds which term is intended to include all things in the nature of seeds, and it has for its object to effect a more rapid drying and cleaning treatment than can be achieved with apparatus in use at the present time, while at the same time providing a saving of labour, factory space and capital outlay and to this end according to this invention there is provided a method of simultaneously drying and cleaning seeds in which the latter is subjected, while being cleaned to remove foreign material such as weeds, dust or the like, to the action of heated drying air and/or heated elements incorporated in the screening members which are normally used for the cleaning of seeds.

Apparatus for carrying out the method in accordance with this invention may comprise any type of apparatus used for cleaning or milling seeds, modified by the incorporation therein of means for subjecting the seed to the action of heated drying air and means for heating the screening members of the apparatus.

By way of example, one form of apparatus adapted in accordance with this invention will now be described with reference to the accompanying drawings, which are somewhat diagrammatic and in which:

Figure 1 is a general view of the apparatus, being drawn partly in side elevation and partly in section, Figure 2 is a section on the line II—II of Figure 1, Figure 3 is a section on the line III—III of Figure 1, being drawn on a larger scale, Figure 4 is an end view looking in the direction of the arrow in Figure 3, Figure 5 is a diagram of the electrical circuit in the apparatus shown in Figures 1 to 4, and Figure 6 is a fragmentary sectional view illustrating another form of screening member adapted in accordance with this invention.

The apparatus shown in Figure 1 comprises a hopper 1 in which seed to be dried and cleaned is initially placed, seed being fed into it in any suitable manner, for example through a chute 2. The lower end portion 1$^A$ of the hopper is of rectangular shape in cross section, having side walls made of a fine mesh wire 3$^A$, and closed end walls 3$^C$ and extending into this portion of the hopper from above and approximately centrally thereof is an elongated hollow container 4, also of rectangular shape in cross section which is made of sheet metal and from the opposite side walls of which internal louvres 5 have been pressed out, the apertures thus formed being covered on the outside by fine mesh wire 3$^B$. The container 4 is in effect substantially co-extensive with one inside dimension of the lower end portion 1$^A$ of the hopper. The container 4 is closed at its lower end and communicates at its upper end with the lower end of a chamber 6 in which is mounted electric heating elements 7. The upper end of the chamber 6 communicates with the outlet of a fan which together with its driving motor is housed in a casing 8. With this arrangement heated air is blown down into the container 4, the louvres 5 serving to spread the air throughout the container passes through the mesh wire 3$^B$ and the seed in the lower end portion 1$^A$ of the hopper and out through the mesh wire 3$^A$ after which it disperses in the surrounding atmosphere. In practice the seed flows comparatively slowly through the lower end portion 1$^A$ of the hopper, any usual form of flow restrictor device being provided at this point, and while therein it is subjected to the heating or sweating action of the heated air. Moreover, as is customary with seed drying apparatus the first bag or two of seed passed through is returned to the hopper 1 and passed through a second time.

Seed is fed from the lower end of the hopper on to a device such as a reciprocating member 10 adapted automatically to feed the seed into a funnel 11 from which it passes on to grading means, as will be described in more detail hereinafter. In falling from the member 10 into the funnel 11 the seed passes through a current of air, which may be heated, from a fan 12, this serving to remove from the seed dust and other lightweight foreign matter, which is carried by the air into a collecting box 13.

The grading means shown in Figure 1 comprises a plurality of superimposed screens 14 adapted to be reciprocated, in known manner, through an eccentric 15, the outlet of the funnel 11 being arranged above one end of the uppermost screen. At the opposite end this screen and those below it have discharge chutes 16 from which graded seed is passed into collecting boxes 17.

As shown in Figures 3 and 4 of the drawings, each screen 14 is made up of wooden side members 20 between which are arranged in equally spaced parallel relationship a number of longitudinally extending bars 21, also made of wood. The actual screening surface is made of electrically conducting metallic material such as wire mesh, perforated metal or the like, and is formed in sections 22, one of which extends between each side member 20 and the adjacent bar 21 and between the adjacent bars, the sections being arranged and secured so that their edges do not contact each other. In Figure 3, one bar 21 has been shown partly broken away to show clearly this spacing of the screen sections 22. Adjacent ends of the screen sections 22 are connected by straps 23 of electrically conducting material, the connection being made alternatively first at one end of the screen and then at the other. The sections are thus all connected in zig-zag fashion in series, and in fact are adapted to form part of an electrical circuit, a diagram of which is shown in Figure 5.

Extending across one end of the screen is a bar 24 of electrically conducting material, this bar being spaced from the screen sections and supported at its opposite ends in the side members 20. At one end the bar 24 is connected by a lead 25 to the screen section immediately below it, while at its other end it is connected to an electric lead 26, the screen section beneath this latter end being connected to a second electric lead 27. The leads 26 and 27 are connected to a suitable electricity supply source through a transformer 28 and a spring conductor device 29 and further lead 26$^A$ adapted to allow for the reciprocation of the screen without subjecting the leads to strain or shock.

It is arranged that a relatively small current is passed through the screen sections whereby they become heated in the like manner to the elements of an electric fire, but not to a temperature sufficient to damage the seed in any way, that is to a so-called "black-heat" only.

Thus it will be apparent from the foregoing description that seed, while being cleaned and graded, is simultaneously dried. The need for separate means for drying the seed is obviated. In most cases seed leaving the screens 14 will be correctly graded and quite clean and dry, and can be passed direct to bagging means (not shown). If necessary, however, the seed can be passed to further grading and/or cleaning means, which would also have incorporated therein heating elements.

It will be noted that the screen sections 22 are secured to the lower surfaces of the bars 21, and if a length of baling wire or the like is accidentally passed to the screens 14 the bars 21 will normally prevent it causing a short circuit across or between two or more screen sections.

It is pointed out once again that the present invention is not limited to any particular type of apparatus. With little difficulty almost any type of cleaning and grading apparatus could be modified in accordance with this invention. In Figure 6, for example, there is shown a fragment of a cylinder grader, the outer surface and tray thereof being furnished with elements 30 for heating same.

I claim:

1. Apparatus for simultaneously drying and cleaning seed comprising a container for initially receiving the seed to be dried and cleaned, means within said container for subjecting seed therein to the action of heated air to bring moisture in the seed to the surface thereof, means for feeding seed thus treated from the container, screening means for receiving the seed as it is fed from the container by said feeding means and adapted to remove foreign matter from the seed, and heating elements incorporated in said screening means for drying the seed while it is being screened.

2. Apparatus for simultaneously drying and cleaning seed comprising a hopper for initially receiving the seed to be dried and cleaned, the wall of at least part of this hopper being made of fine mesh wire, a container extending into said part of the hopper and also having a wall of fine mesh wire, means for blowing heated air into said container to subject seed in the hopper to the action of such heated air to bring moisture in the seed to the surface thereof, means for feeding seed thus treated from the container, screening means for receiving the seed as it is fed from the container by said feeding means and adapted to remove foreign matter from the seed, and heating elements incorporated in said screening means for drying the seed while it is being screened.

3. Apparatus for simultaneously drying and cleaning seed comprising a container for initially receiving the seed to be dried and cleaned, means within said container for subjecting seed therein to the action of heated air to bring moisture in the seed to the surface thereof, means for feeding seed thus treated from the container, and screening means for receiving the seed as it is fed from the container by said feeding means and adapted to remove foreign matter from the seed, said screening means comprising a plurality of metallic screens arranged in an electrical circuit to form heating elements for drying the seed while it is being screened.

4. Apparatus as claimed in claim 3 wherein each screen comprises a plurality of sections connected in series in the electrical circuit.

5. Apparatus as claimed in claim 4 with the screen sections arranged in spaced parallel relationship, and support members disposed between adjacent sections and upstanding therefrom so that an electrically conducting element which might accidentally fall on to the screen will normally be prevented from causing a short circuit between adjacent screen sections.

6. Apparatus for simultaneously drying and cleaning seed comprising a hopper for initially receiving the seed to be dried and cleaned, the wall of at least part of this hopper being made of fine mesh wire, a container extending into said part of the hopper and also having a wall of fine mesh wire, means for blowing heated air into said container to subject seed in the hopper to the action of such heated air to bring moisture in the seed to the surface thereof, means for feeding seed thus treated from the container, and screening means for receiving the seed as it is fed from the container by said feeding means and adapted to remove foreign matter from the seed, said screening means comprising a plurality of metallic screen elements arranged in an electrical circuit to form heating elements for drying the seed while it is being screened.

References Cited in the file of this patent

UNITED STATES PATENTS

| | | |
|---|---|---|
| 1,802,476 | Peterson | Apr. 28, 1931 |
| 2,679,316 | Ruepp | May 25, 1954 |

FOREIGN PATENTS

| | | |
|---|---|---|
| 18,924 | Great Britain | July 18, 1907 |